United States Patent [19]

Antypas et al.

[11] 3,769,536

[45] Oct. 30, 1973

[54] III-V PHOTOCATHODE BONDED TO A FOREIGN TRANSPARENT SUBSTRATE

[75] Inventors: George A. Antypas, Palo Alto; Malcolm L. Kinter, Sunnyvale, both of Calif.

[73] Assignee: Varian Associates, Palto Alto, Calif.

[22] Filed: Jan. 28, 1972

[21] Appl. No.: 221,679

[52] U.S. Cl. .................... 313/94, 313/103, 313/108

[51] Int. Cl. .................... H01j 39/04, H01j 43/04

[58] Field of Search .................... 313/94

[56] References Cited

UNITED STATES PATENTS

| | | | |
|---|---|---|---|
| 3,310,701 | 3/1967 | Heimann | 313/94 |
| 3,387,161 | 6/1968 | Van Laar et al. | 313/94 |
| 3,447,014 | 5/1969 | Jordan | 313/94 |
| 3,644,770 | 2/1972 | Bell | 313/94 |
| 3,696,262 | 10/1972 | Antypas | 313/94 |

*Primary Examiner*—Roy Lake
*Assistant Examiner*—James B. Mullins
*Attorney*—Stanley Z. Cole et al.

[57] ABSTRACT

A III-V photocathode layer was bonded to a foreign transparent substrate, preferably glass, by heat treatment. The foreign substrate was selected on the basis of matching thermal expansion characteristics and transparency considerations. The photocathode layer and the foreign substrate were complimentarily shaped, preferably flat, pressed together, and then heat treated. The resulting flexibility and lowered surface tension of the substrate caused the substrate to microscopically conform to microscopic irregularities in the photocathode surface. External pressure was applied across the substrate-cathode interface to facilitate the bonding process. The time required to complete the bonding depended on the pressure and temperature of the heat treating step. An optional silicon dioxide passivating layer was provided between the photocathode layer and the substrate to prevent diffusion into the photocathode of poisonous substances commonly found in glass which are detrimental to the operation of the cathode.

12 Claims, 4 Drawing Figures

III-V PHOTOCATHODE BONDED TO A FOREIGN TRANSPARENT SUBSTRATE

The invention herein described was made in the course of Government Contract DAAK-02-69-C-0420 with the Department of Army.

BACKGROUND OF THE INVENTION

1. Field of the Invention

This invention relates to III-V photocathodes and more particularly to such cathodes with foreign transparent substrates.

2. DESCRIPTION OF THE PRIOR ART

Heretofore, transparent foreign substrates have not been obtainable for thin-transparent III-V photocathodes. A III-V substrate having a composition and lattice constant closely matched to that of the III-V cathode layer is taught in application Ser. No. 3,949, entitled "A Multilayered III-V Photocathode Having A High Quality Active Layer," by Lawrence James, George Antypas, Ronald Bell and John Uebbing, and assigned to the present assignee. The active or cathode layer was epitaxially grown on the III-V substrate. The close match of composition and lattice constant therebetween permitted initial growth of a high quality III-V film or active layer over the substrate. This high crystal quality combined with the fact that the active thickness was comparable to the electron diffusion length, resulted in a photocathode of high performance. A limitation of this closely matched III-V substrate-III-V active layer structure is that the bandgap of the substrate was only slightly higher than the bandgap of the active layer. This inherent window, while preferred for some applications, is undesirable where a wide bandgap substrate is required.

Further, it is known to epitaxially grow GaAs on a GaP substrate. The lattice constant and composition mismatch here is considerably greater than the above example, resulting in a poor quality crystals grown proximate the substrate-active layer interface. Thick active layers had to be grown to displace the strain and dislocations of the interface farther from the emissive surface which must be of high quality in order to avoid electron trapping. Light absorbed in the interim thickness of the active layer reduced the light available to generate free electrons near the high quality emissive surface.

SUMMARY OF THE INVENTION

It is therefore an object of this invention to: provide a III-V photocathode bonded to a foreign transparent substrate material; provide a III-V photocathode layer bonded to glass having corresponding thermal characteristics; provide a III-V photocathode with a low strain substrate-active layer interface; and provide a substrate material which may be varied in composition to thermally accommodate the III-V photocathodes.

Briefly these and other objects of the invention are achieved by providing a non-crystaline glass substrate with a thin high quality III-V conversion layer heat bonded thereto. The conversion layer is formed of at least one element selected from the third column of the Periodic Table and at least one element selected from the fifth column of the Periodic Table. The composition of the substrate is designed to provide a coefficient of thermal expansion which substantially matches the coefficient of thermal expansion of the III-V conversion layer. The thermal match produces a strain free interface between the substrate and the III-V conversion layer which supports the conversion efficiency of the photocathode. A silicon dioxide passivating layer may be provided to prevent diffusion of undesirable substances from the glass into the cathode during the heat bonding step.

BRIEF DESCRIPTION OF THE DRAWINGS

Further objects and advantages of the present invention and the operation of the non-crystaline substrate photocathode will become apparent from the following detailed description taken in conjunction with the drawings in which:

FIG. 1 shows a photomultiplier tube 10 incorporating a two layer embodiment of the invention having a conversion layer bonded directly on glass. Photomultiplier tube 10 is formed by vacuum envelope 12 having a glass window 14 forming the display portion thereof. A III-V conversion layer 16 is directly bonded to glass window 14. Glass window 14 readily permits input photons to pass therethrough with negligible absorption. The photons cross the substrate-conversion layer interface 18 and enter conversion layer 16 which is of high quality and stress free, even proximate interface 18. The photons are converted into electrons which easily diffuse across conversion layer 16 to emissive surface 20 because the thickness of conversion layer 16 is about the same thickness as the diffusion length of the electrons generated therein. The electrons are emitted from surface 20 into the vacuum and strike the first stage of multiplication dynodes 22.

FIG. 2 shows an imaging tube 40 incorporating a three layer embodiment of the invention having an intermediate passivation layer. Imaging tube 40 is formed by a vacuum envelope 42 having a display window 44 therein. As in the FIG. 1 embodiment, display window 44 forms the substrate for the conversion layer. In the FIG. 2 embodiment, however, a passivation layer 46 is sputtered onto the conversion layer 48 and the resulting double layer is heat bonded to substrate 44. The intermediate passivation layer 46 prevents harmful elements or constituents of substrate 44 from diffusing into and poisoning conversion layer 48 during the heat treatment or bonding process. Certain elements commonly found in glass, notably Na, K, $S_i$, and B, will noticeably reduce the conversion efficiency of III-V compounds. In operation, radiations from laser 50 illuminate the object 52 to be imaged and strike display window 44. The radiations pass through substrate 44 and passivating layer 46. The radiations enter the high quality conversion layer 48 where they are converted into electrons and emitted from emission surface 54 into the vacuum of imaging tube 40. The electrons are accelerated and focused by electrodes 56 unto a phosphor layer 58 supported on a glass substrate 60. The resulting intensified image of object 52 may be viewed through eye piece 62.

FIG. 3 shows a flow diagram illustrating the steps for manufacturing the foreign substrate photocathode shown in FIGS. 1 and 2.

STEP 1

First, a foreign substrate must be selected having suitable mechanical and wide bandgap or transparency characteristics. The substrate must heat bond properly to the photocathode. A critical feature in this selection is the matching of thermal properties, particularly the coefficient of thermal expansion, over the temperature range involved in manufacture. A severe mismatch in thermal expansion characteristics will result in destruction of the heat bond through internal stress and separation or chipping away of the photocathode conversion layer during cooling. A closer match of the coefficient of thermal expansion will prevent the bond destruction; however, any mismatch at all will introduce mechanical strain at the substrate-conversion layer interface. This strain, even if not resulting in dislocations in the conversion layer, will reduce the photons to electron conversion efficiency. Ideally, a perfect thermal match between the substrate and the conversion layer is preferred resulting in zero stress and optimum theoretical conversion efficiency. Such an ideal matching, while in theory is available, cannot always be obtained, and limited mismatching is tolerable. Slight mismatches in thermal characteristics will produce limited stress having negligible effect on the conversion efficiency.

Of all the available foreign substrates, glass is preferred. Glass is transparent to photons over a wide frequency range. Further, glass is mechanically and chemically stable, and is available in various compositions having infinite concentrations and proportions allowing control and determination of the resulting thermal coefficient characteristic. Glass is sufficiently flexible in composition to closely match the coefficient of expansions of all of the III-V binaries and ternaries useful for photocathode applications. Further, glass is available which softens below the melting points of the III-V crystals thus permitting a heat bond therebetween.

Figures 1, 2, 3:
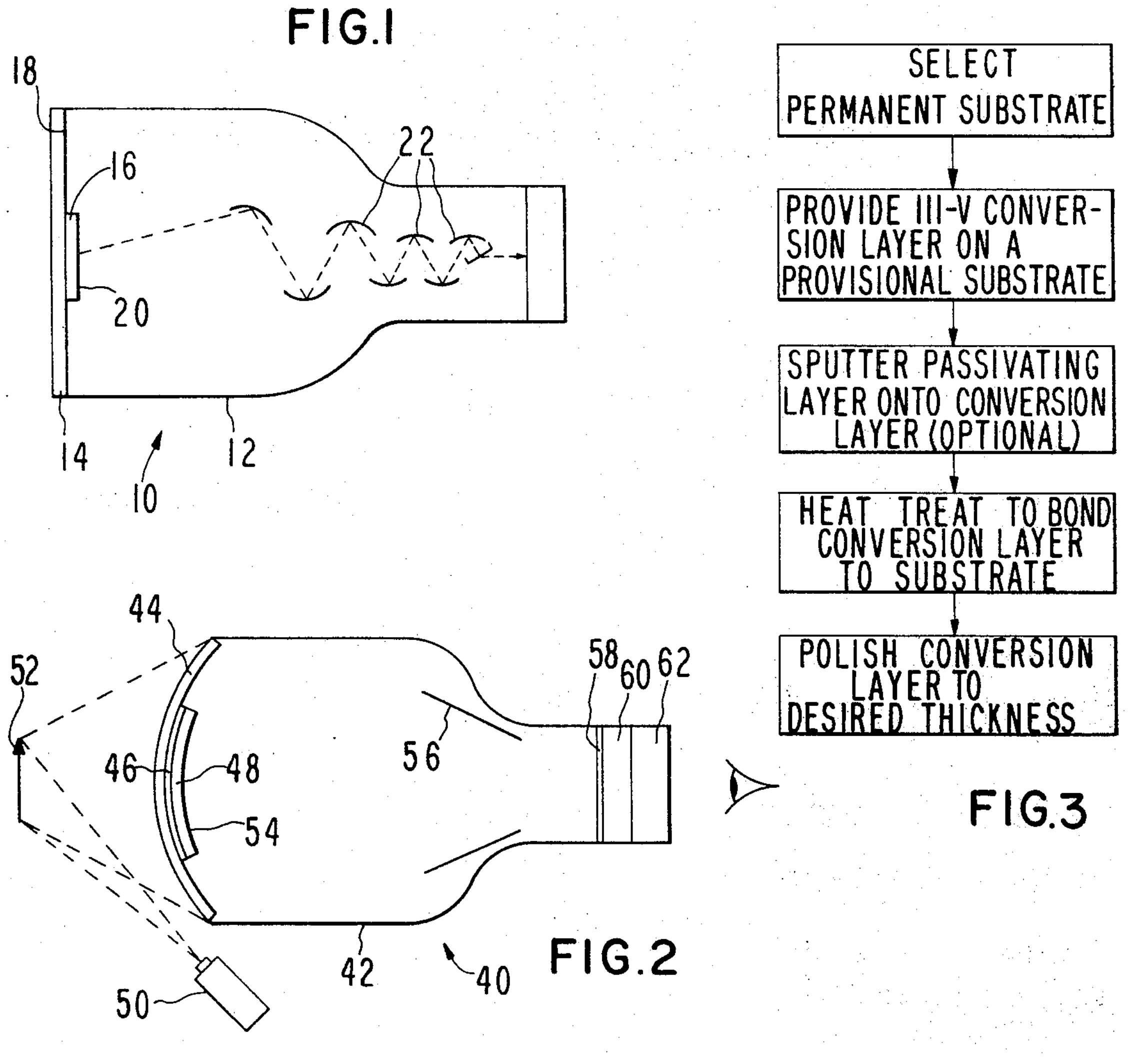
FIG. 1 is a schematic diagram taken in section of a photomultiplier tube of a conversion layer mounted directly onto the glass substrate.
FIG. 2 is a schematic diagram shown in section of an imaging tube employing a passivating layer between the conversion layer and the glass substrate.
FIG. 3 is a flow chart showing the steps in manufacturing the glass substrate-III-V photocathode of FIGS. 1 and 2.
Figure 4:
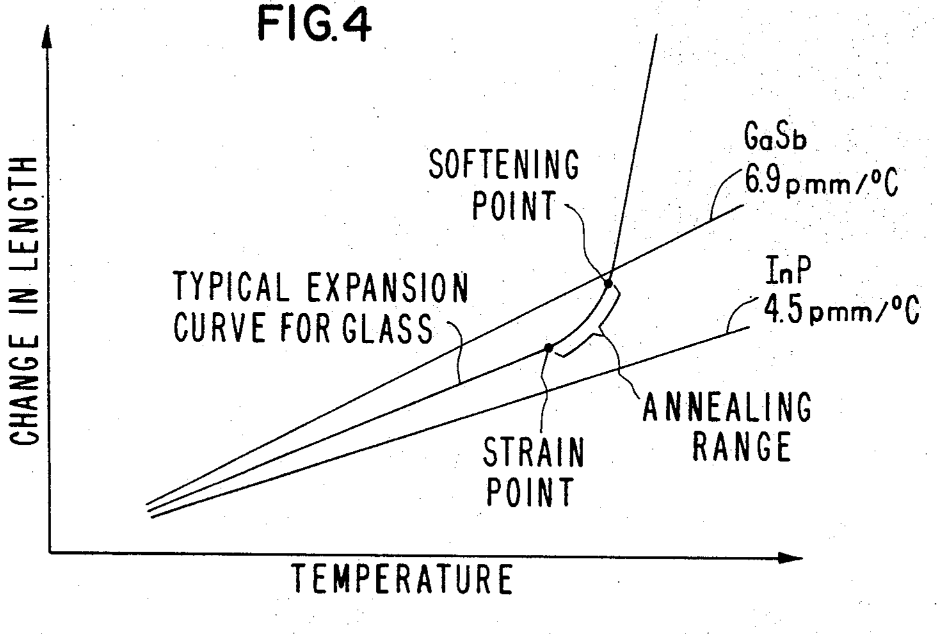
FIG. 4 is a plot of temperature versus change in length for a typical glass substance and several of the commonly used III-V compounds.

FIG. 4 shows the temperature versus expansion characteristics of a typical glass substance. Superimposed over this glass curve are the linear temperature versus expansion curves for several of the well known III-V compounds particularly useful as photocathodes. At lower temperatures, the thermal characteristic curve for glass is strikingly linear. The slope of this initial linear portion is determined by the particular composition of the glass. The composition may be selected to produce a slope matching any of the III-V compounds. The glass thermal curve becomes nonlinear and exhibits a knee in the annealing range. The first noticeable nonlinearity in the initial linear curve is defined as the strain point representing the lower limit of the annealing range. The upper limit of the annealing range is referred to as the softening point. The strain point, the annealing range, and the softening point, are all determined by the composition of the glass. Glass with a relatively low strain point is preferred because the glass then becomes flexible at a lower temperature, and the heat bonding may be accomplished at a lower temperature. It is preferred that the heat bonding occur at a temperature below the melting points of the III-V compound forming the conversion layer. A further limitation on the strain point of the glass and the heat bonding temperature during manufacturing concerns a modification employing cesium and cesium oxide work function reducing layers placed over the conversion layer to encourage electron emission. These work functions reducing layers are deposited on the conversion layer after the conversion layer has been heat cleaned at a temperature of about 630° C. To avoid disturbing the heat bond during this subsequent heat cleaning step, it is preferred that the strain point and heat bonding temperature be about 50° C greater than 630° in the $CsO_2$ embodiments.

While many glass systems are operable as a noncrystaline substrate for the III-V conversion layer, boro-silicate glasses are preferred in view of the above described thermal expansion coefficience and strain point temperature constraints. Boro silicate glass has a general composition as follows:

| | |
|---|---|
| Silica — $SiO_2$ | 80% |
| Boric Oxide — $B_2O_3$ | 14% |
| Soda — $Na_2O$ | 4% |
| Alumina — $Al_2O_3$ | 2% |

By varying the above composition, the coefficient of thermal expansion may vary from about 0.55 ppm/° C to about 8.0 ppm/° C; and the strain point may be varied from about 1,000° C to about 500° C. Increasing the percentage of $SiO_2$ will decrease the coefficient of thermal expansion and increase the strain point. The technology of determining the coefficient of expansion and strain points are well known and are described in a publication from the Journal of Non-crystaline Solids, Volumn 6, pages 145–162 (1971) by S. Sakka and J. D. MacKenzie, entitled "Relation Between Apparent Glass Transition Temperature and Liquidus Temperature For Inorganic Glasses." The composition of the boro silicate glass may be varied to produce a strain point temperature of preferably greater than 680° (630° C plus 50° C) and to have a thermal coefficient of expansion from about 5.5 ppm/° C to about 7 ppm/° C for substantially matching the coefficient of expansion of the commonly used III-V compounds (listed in the following table) and the ternary III-V compounds derived therefrom.

| | | |
|---|---|---|
| Al P | GaP | In P |
| Al As | GaAs | In As |
| Al Sb | GaSb | In Sb |

The ternary III-V cathodes formed by the above listed binary III-V compounds have coefficience of thermal expansion intermediate to the coefficient of the constituent binary III-Vs, which may readily be matched by varying the composition of the boro silicate glass substrate.

STEP 2

After having selected and fabricated the substrate glass layer, a high quality III-V conversion layer of the desired bandgap and composition must be provided. It is preferred that the conversion layer be free from structural imperfections such as crystal voids and dislocations, and free from chemical impurities. The presence of either of the above defects reduce the electron diffusion length and reduce the emission efficiency of the device. The longer the electron diffusion length, the more probable will be the emission of a particular electron. It is further preferred that the III-V conversion layer be very thin, comparable in thickness to the electron diffusion length. The III-V compounds have a high absorption coefficient at the operative wavelengths. Substantially all of the incident photons are absorbed within the first micron of penetration. Conversion layers thicker than one micron add little to the photon absorption efficiency, and detract slightly from the electron emission efficiency because the photo-excited electrons must diffuse through the additional thickness. One micron is therefor preferred. However, due to the critical polishing required to obtain one micron, a thicker layer such as three microns may be employed satisfactorily.

One technique for providing a very thin very high quality conversion layer is to epitaxially grow the desired binary or ternary III-V conversion layer on top of a commercially purchased binary or ternary III-V substrate. This is a provisional substrate which is removed after the conversion layer has been mounted on the glass substrate. Commercially purchased III-V compounds are generally of a good quality and grown under exacting conditions, but the present applications require a very high quality crystal. The conversion layer is grown on the substrate to a thickness of about 20 microns, to produce a high quality crystal free from defects associated with epitaxial layer-substrate interface. At about fifteen microns the interfacial defects have been mended and the quality of the grown conversion layer is very high and suitable for use in the present application.

STEP 3

The surface of the conversion layer is polished smooth and a passivating layer of silicon dioxide about 2,000 angstroms thick is RF sputtered onto the polished conversion layer surface. The thickness of the passivating layer is not critical; but less than about 100 angstroms will not adequately prevent diffusion from the glass substrate and thicknesses in excess of 4,000 angstroms introduce thermal expansion complications.

STEP 4

The substrate-conversion layer-passivating layer assembly is then placed against the glass substrate with the passivating layer close thereto. The temperature is raised to about the strain point of the glass substrate and maintained for about 10 minutes at a pressure of about 10 grams per square centimeter. The time required to effect the heat bonding is dependent on the strain temperature of the substrate, the temperature of the heat bonding step, and the pressure applied to urge the conversion layer against the substrate.

STEP 5

The provisional III-V substrate is then polished away along with the 15 microns of epitaxially grown III-V layer required to cure the interfacial defects. The remaining five microns of high quality III-V crystal may be polished down to the preferred thickness of the particular application.

EXAMPLE 1: GaAs

A 20 micron epitaxial layer of GaAs was grown on a bulk, commercially purchased GaAs substrate by liquid phase epitaxy. The grown layer was mechanically polished to remove growth steps, and then etched to remove the damaged surface. A 2,000 angstroms passivating layer of $S_iO_2$ was sputtered on the polished surface of the grown layer. The GaAs was then heat bonded to a glass substrate having an expansion coefficient closely matching that of GaAs (about 5.76± about 2% ppm/° C) and a transition temperature of less than 680° C. A pressure of about 10 grams per square millimeter was applied during bonding. The bonding step was continued for about 10 minutes. The commercially purchased substrate was polished off along with most of the grown layer leaving about three microns of GaAs over the $S_iO_2$ layer. A glass suitable for GaAs may be purchased from Schott Manufacturing of Germany and New Jersey, number LAK-8 (5.6 ppm/° C, transition temperature 640° C) or LAKN-19 (5.9 ppm/°C, transition temperature 658°C).

EXAMPLE 2: In As P

A 25 micron layer of $InAs_{.17}P_{.83}$ having an expansion coefficient of about 4.65 ppm/° C, was grown on a commercially purchased substrate of InP. The grown layer was polished and etched and a 1,000 angstroms $S_i$ $O_2$ layer was sputtered thereon. The InAsP was then heat bonded to a glass substrate having a matching expansion coefficient and appropriate transition temperature under pressure. The commercial substrate was polished off along with the lower quality InAsP proximate the substrate.

Clearly, various changes may be made in the structure and embodiments shown herein without departing from the concept of the present invention. For example, the substrate-cathode unit may be mounted in a frame fixed proximate the window of the vacuum envelope. It is not required that the conversion layer be bonded directly to the glass of the window. Other glass systems besides boro silicate may be employed and adjusted in composition to match the thermal coefficient of expansion and strain point requirements.

We claim:

1. A photocathode for providing free electrons in response to incident photons, comprising the combination:

a crystaline conversion layer which generates the free electrons in response to the incident photons, the conversion layer formed of at least one element selected from the group consisting of A1, Ga or In, and at least one element selected from the group consisting of P, As or Sb; and a foreign transparent substrate for supporting the conversion layer which is heat bonded thereto, the foreign substrate having a coefficient of thermal expansion substantially matching the coefficient of thermal expansion of the conversion layer.

2. The photocathode specified in claim 1, wherein the conversion layer is about 3 microns in thickness.

3. The photocathode specified in claim 1, wherein the conversion layer has a thickness comparable to the diffusion length of the free electrons generated therein by the incident photons.

4. The photocathode specified in claim 1, wherein the conversion layer has a thickness substantially equal to the absorption depth of the incident photons.

5. The photocathode specified in claim 1, wherein the conversion layer is about 1 micron in thickness.

6. The photocathode specified in claim 1, wherein the conversion layer is formed of GaAs.

7. The photocathode specified in claim 1, wherein the conversion layer is formed of In As P.

8. The photocathode specified in claim 1, wherein a passivating layer is provided between the substrate and the conversion layer for preventing diffusion of conversion efficiency reducing substances from the substrate into the conversion layer.

9. The photocathode specified in claim 8, wherein the passivating layer is approximately 2,000 angstroms in thickness and is formed of $S_iO_2$.

10. The photocathode specified in claim 1, wherein a work function reducing layer is formed over the conversion layer in order to reduce the escape barrier to free electrons generated within the conversion layer.

11. The photocathode specified in claim 10, wherein the work function reducing layer is formed of a thin alkali metal layer covered with a cesium oxide layer.

12. The photocathode specified in claim 1, wherein the foreign substrate is a wide bandgap glass.

* * * * *